United States Patent
Song et al.

(10) Patent No.: US 9,857,600 B2
(45) Date of Patent: Jan. 2, 2018

(54) LENS GRATING BASED STEREOSCOPIC DISPLAY SYSTEM

(71) Applicant: SuperD Co. Ltd., Shenzhen (CN)

(72) Inventors: Lei Song, Shenzhen (CN); Yinwei Chen, Shenzhen (CN); Zhang Ge, Shenzhen (CN); Ning Liu, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 591 days.

(21) Appl. No.: 14/099,002

(22) Filed: Dec. 6, 2013

(65) Prior Publication Data
US 2014/0160380 A1 Jun. 12, 2014

(30) Foreign Application Priority Data
Dec. 7, 2012 (CN) .......................... 2012 1 0524142

(51) Int. Cl.
| | |
|---|---|
| G02B 27/22 | (2006.01) |
| G02B 5/18 | (2006.01) |
| G02F 1/03 | (2006.01) |
| G02F 1/1335 | (2006.01) |
| G02F 1/35 | (2006.01) |

(52) U.S. Cl.
CPC ....... G02B 27/2214 (2013.01); G02B 5/1866 (2013.01)

(58) Field of Classification Search
None
See application file for complete search history.

(56) References Cited

U.S. PATENT DOCUMENTS

| | | | | |
|---|---|---|---|---|
| 6,940,646 B2* | 9/2005 | Taniguchi | .......... | G02B 27/2214 348/54 |
| 2006/0139759 A1* | 6/2006 | Hashimoto | ........ | H04N 13/0406 359/619 |
| 2008/0088922 A1 | 4/2008 | Hashimoto et al. | | |
| 2009/0231698 A1* | 9/2009 | Hashimoto | ............ | B60K 35/00 359/476 |
| 2009/0284954 A1* | 11/2009 | Yamada | ............ | G02F 1/133606 362/97.2 |

(Continued)

FOREIGN PATENT DOCUMENTS

| | | | | | |
|---|---|---|---|---|---|
| CN | 102608767 A | * | 7/2012 | ............. | G02B 27/22 |
| CN | 102662208 | * | 9/2012 | ............. | G02B 27/26 |

(Continued)

*Primary Examiner* — Edward Glick
*Assistant Examiner* — Anthony G Quash
(74) *Attorney, Agent, or Firm* — Anova Law Group, PLLC

(57) ABSTRACT

A three-dimensional (3D) display system is provided for displaying a 3D image. The 3D display system includes a display panel having pixels arranged at a pixel spatial period and a lens grating disposed together with the display panel. The lens grating further includes a plurality of lens units arranged at a first period and a plurality of non-lens units arranged at a second period. The second period is greater than one-third of the first period and less than two-thirds of the first period, and the plurality of lens units and the plurality of non-lens units are arranged such that the lens grating has a different spatial period from the pixel spatial period to reduce Moire fringe effect between the lens grating and the pixels of the display panel.

3 Claims, 4 Drawing Sheets

(56) References Cited

U.S. PATENT DOCUMENTS

| | | | | |
|---|---|---|---|---|
| 2009/0316058 | A1* | 12/2009 | Huizinga | G02B 6/0053 349/15 |
| 2010/0027113 | A1* | 2/2010 | Shin | H04N 13/0404 359/463 |
| 2010/0245714 | A1* | 9/2010 | Watanabe | G02B 5/02 349/64 |
| 2012/0320288 | A1* | 12/2012 | Baek | G02B 3/14 349/5 |
| 2013/0286476 | A1* | 10/2013 | Fukushima | G02B 27/2214 359/463 |

FOREIGN PATENT DOCUMENTS

| | | | | | |
|---|---|---|---|---|---|
| CN | 102662208 | A | | 9/2012 | |
| CN | 102879837 | A | * | 1/2013 | G02B 27/22 |
| CN | 103309096 | A | * | 9/2013 | G02F 1/13306 |
| JP | 2002250895 | A | | 9/2002 | |
| WO | WO 2005025238 | A2 | * | 3/2005 | H04N 13/0404 |

* cited by examiner

LENS GRATING BASED STEREOSCOPIC DISPLAY SYSTEM

CROSS-REFERENCES TO RELATED APPLICATIONS

This application claims the priority of Chinese patent application number no. 201210524142.9, filed on Dec. 7, 2012, the entire contents of which are incorporated herein by reference.

FIELD OF THE INVENTION

The present disclosure generally relates to the opt-electronic technologies and, more particularly, to a lens grating and stereoscopic display system.

BACKGROUND

Autostereoscopic display technology does not require users to wear traditional glasses and, thus, fits more closely with people's daily habits and becomes the trend for 3-dimensional (3D) display technology. An autostereoscopic display panel generally includes a display panel and a parallax light-splitting device. The display panel often is a liquid crystal display (LCD) panel or a plasma display panel, while the parallax light-splitting device often includes a parallax barrier grating device or a lens grating device.

For the display panel, whether it is a liquid crystal display panel or a plasma display panel, pixels are arranged both in the horizontal direction and in the vertical direction with equal space intervals, respectively. Between the pixels in the horizontal direction and in the vertical direction, opaque stripes with equal intervals are also formed, i.e., the black matrix. Further, for the parallax light-splitting device, whether it is a parallax barrier grating device or a lens grating device, strip-shaped optical units of the parallax light-splitting device are arranged with equal space intervals, a spatial periodical structure similar to the pixel arrangement on the display panel. Thus, during display operation, it may be easy for the two devices to produce optical interference, which may cause Moire fringe in the viewing area, affecting the 3D display effects.

To reduce the Moire fringe impact on the 3D display effects, currently design methods often arrange the stripe-shaped grating in a tilted angle with respect to the columns of the pixels of the display panel. However, under this arrangement, because the tilted grating can cause the tilted line of sight to mismatch the rectangular shape of the display panel pixels. The viewer may see crosstalk between view images, causing more ghost phenomenon and impacting on the 3D image display quality.

The disclosed device and method are directed to solve one or more problems set forth above and other problems.

BRIEF SUMMARY OF THE DISCLOSURE

One aspect of the present disclosure includes a three-dimensional (3D) display system for displaying a 3D image. The 3D display system includes a display panel having pixels arranged at a pixel spatial period and a lens grating disposed together with the display panel. The lens grating further includes a plurality of lens units arranged at a first period and a plurality of non-lens units arranged at a second period. The second period is greater than one-third of the first period and less than two-thirds of the first period, and the plurality of lens units and the plurality of non-lens units are arranged such that the lens grating has a different spatial period from the pixel spatial period to reduce Moire fringe effect between the lens grating and the pixels of the display panel.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings.

Figure 10:
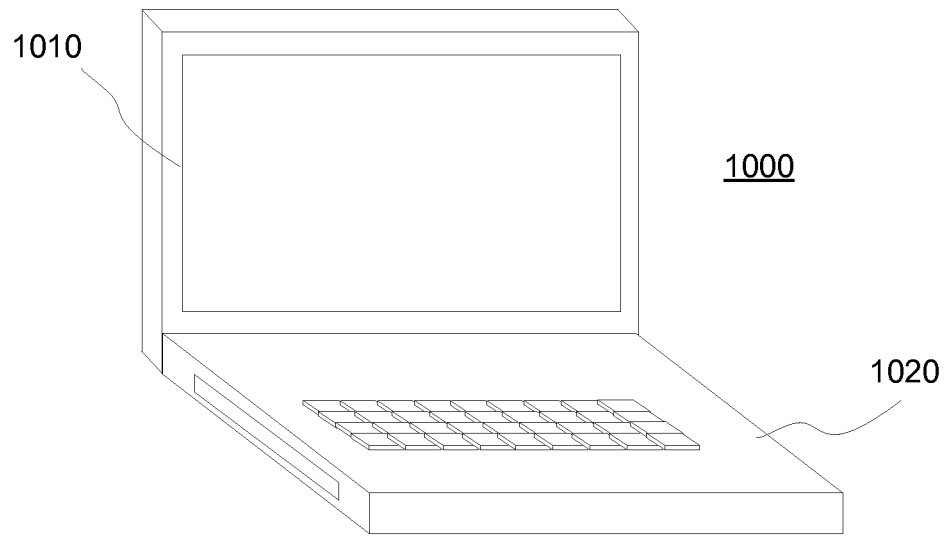
FIG. 10 illustrates an exemplary environment incorporating certain aspects of the invention.

FIG. 10 illustrates an exemplary environment incorporating certain aspects of the invention. As shown in FIG. 10, a three-dimensional (3D) display system 1000 may include a 3D display device 1010 and a base 1020. The 3D display system 1000 may include any appropriate system that is capable of processing and displaying two-dimensional (2D) or 3D images, such as a computer, a television set, a smart phone, or a consumer electronic device. Although 3D display system 1000 is shown as a notebook computer, any device with computing power may be used.

The 3D display device 1010 may include any appropriate type of 3D display screen based on plasma display panel (PDP) display, field emission display (FED), cathode ray tube (CRT) display, liquid crystal display (LCD), organic light emitting diode (OLED) display, or other types of displays. Further, 3D display device 1010 may also be touch-sensitive, i.e., a touch screen. Other display types may also be used.

Figure 11:
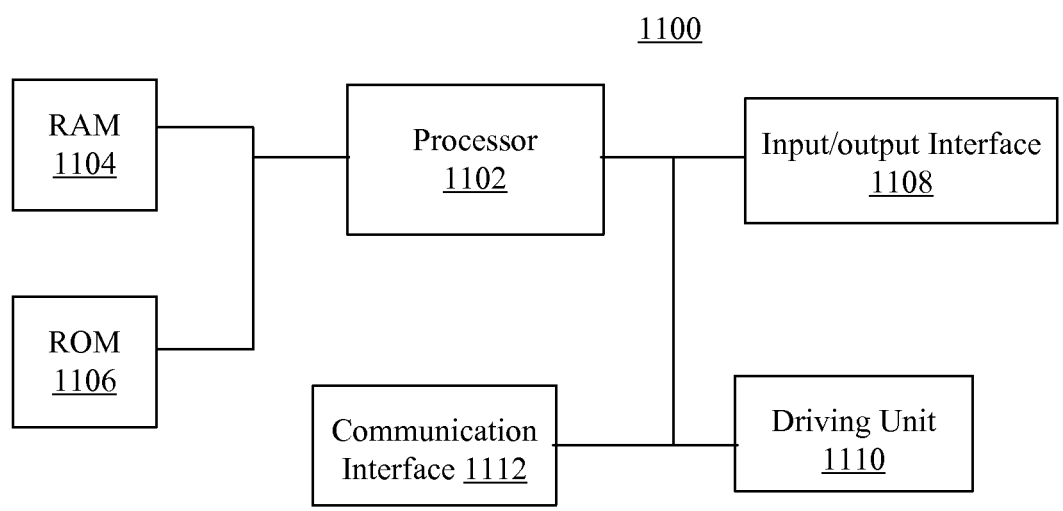
FIG. 11 illustrates an exemplary controller consistent with the disclosed embodiments.

Base 1020 may include any appropriate structures and components to support operations of 3D display system 1000. For example, base 1020 may include a controller to control operation of 3D display device 1010. FIG. 11 illustrates an exemplary controller consistent with the disclosed embodiments.

As shown in FIG. 11, controller 1100 may include a processor 1102, a random access memory (RAM) unit 1104, a read-only memory (ROM) unit 1106, an input/output interface unit 1108, a driving unit 1110, and a communication interface 1112. Other components may be added and certain devices may be removed without departing from the principles of the disclosed embodiments.

Processor 1102 may include any appropriate type of graphic processing unit (GPU), general-purpose microprocessor, digital signal processor (DSP) or microcontroller, and application specific integrated circuit (ASIC), etc. Processor 1102 may execute sequences of computer program instructions to perform various processes associated with display system 1000. The computer program instructions may be loaded into RAM 1104 for execution by processor 1102 from read-only memory 1106 to process various 3D images.

Input/output interface 1108 may be provided for users to input information into 3D display system 1000 or for the users to receive information from 3D display system 1000. For example, input/output interface 1108 may include any appropriate input device, such as a remote control, a keyboard, a mouse, an electronic tablet, a voice communication device, or any other optical or wireless input device. Further, driving unit 1110 may include any appropriate driving circuitry to drive various devices, such as 3D display device 1010.

Further, communication interface 1112 may provide communication connections such that controller 1100 may be accessed by and/or communicate with other processors or systems through computer networks or other communication links via various communication protocols, such as transmission control protocol/internet protocol (TCP/IP) and hyper text transfer protocol (HTTP).

The 3D display device 1010 may include a display panel and a lens grating disposed on the top of the display panel. Because both the black matrix of the display panel and the lens grating are spatial structures with fixed space intervals, to avoid the optical interference between the black matrix of the display panel and the lens grating that causes Moire fringe, the disclosed embodiments provide a lens grating with modified lens shape and additional periodical structure units in the lens grating, such that the spatial period of the lends grating and the spatial period of the black matrix of the display panel differs significantly, reducing the Moire fringe effect.

Figure 1:
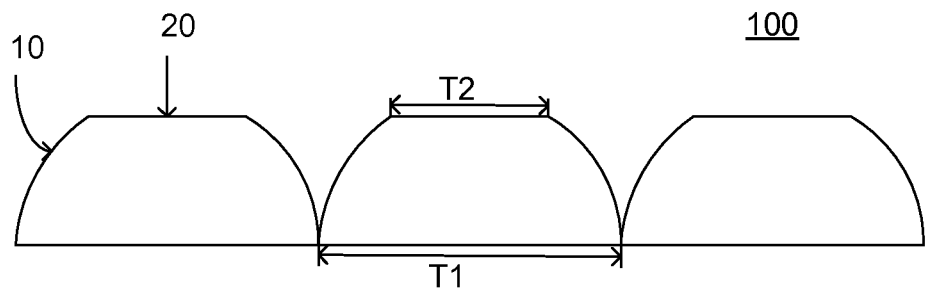
FIG. 1 illustrates an exemplary lenticular lens grating consistent with the disclosed embodiments.

FIG. 1 illustrates an exemplary lenticular lens grating consistent with the disclosed embodiments. As shown in FIG. 1, lens grating 100 may include a series of lens units 10 and a series of non-lens units 20. Other structures may also be included.

A lens unit, as used herein, may refer to any lens from a lens array or lens grating used for parallax light splitting for 3D display. A non-lens unit, as used herein, may refer to any structure or light passing device not used for parallax light splitting for 3D display.

The series of lens units 10 may be arranged with a spatial period (e.g., grating period) T1. Each lens unit 10 may be a lenticular lens and may have a cross-section shape of a convex lens. Other types of lens or lens shapes may also be used. For example, each lens unit 10 may also have a cross-section shape of a concave lens. The length of the bottom of each lens unit 10 is also T1. The series of lens units 10 may be arranged in parallel with the pixels of the display panel, or the series of lens units 10 may be arranged in a tilted angle with the pixels of the display panel.

The series of non-lens units 20 may be arranged with a spatial period of T2. Each non-lens unit 20 may be a plane on top of each corresponding lens unit 10 and perpendicular to the optical axis of the lens unit 10. The non-lens unit 20 has a length of T2 that is less than the length of the lens unit 10. For example, $\frac{1}{3} \times T1 < T2 < \frac{2}{3} \times T1$. In one embodiment, $T2 = \frac{1}{2} \times T1$. Because the additional non-lens units 20, the Moire fringe effect may be significantly reduced.

Figure 2:
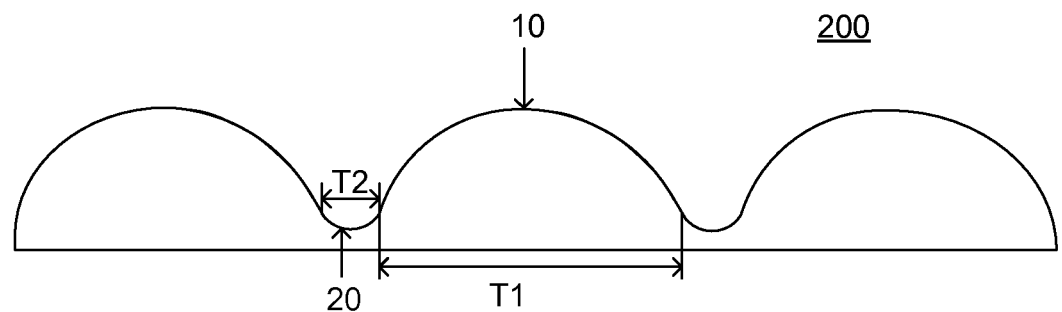
FIG. 2 illustrates another exemplary lenticular lens grating consistent with the disclosed embodiments

FIG. 2 illustrates another exemplary lenticular lens grating consistent with the disclosed embodiments. As shown in FIG. 2, lens grating 200 may include a series of lens units 10 and a series of non-lens units 20. Other structures may also be included.

The series of lens units 10 may be arranged with a spatial period (e.g., grating period) T1. Each lens unit 10 may be a lenticular lens and may have a cross-section shape of a convex lens. Other types of lens or lens shapes may also be used. For example, each lens unit 10 may also have a cross-section shape of a concave lens. The length of the bottom of each lens unit 10 is also T1.

The series of non-lens units 20 may be arranged with a spatial period of T2. Each non-lens unit 20 may be a plane between any two adjacent lens units 10 and perpendicular to the optical axis of the lens unit 10. Alternatively, the non-lens unit 20 may also be any appropriate non-planar shape, such as arc shaped, triangular shaped, or trapezoidal shaped. In one embodiment, the non-lens unit 20 is arc shaped. The non-lens unit 20 has a length of T2 that is less than the length of the lens unit 10. For example, $\frac{1}{3} \times T1 < T2 < \frac{2}{3} \times T1$. In one embodiment, $T2 = \frac{5}{12} \times T1$. Because the additional non-lens units 20, the Moire fringe effect may be significantly reduced.

Figure 3:
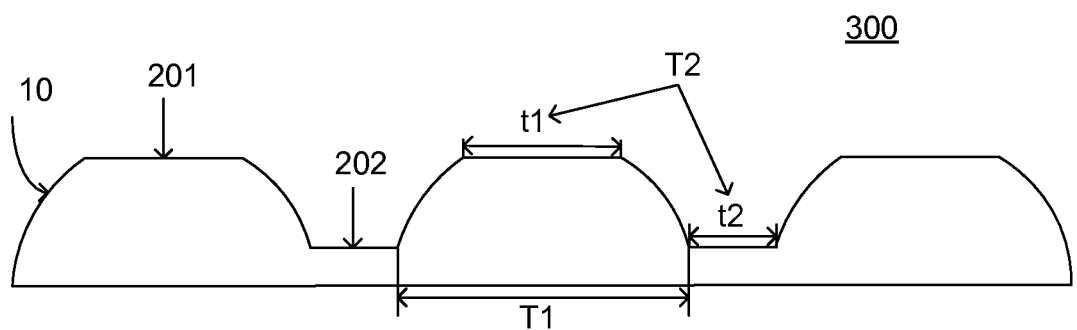
FIG. 3 illustrates another exemplary lenticular lens grating consistent with the disclosed embodiments

FIG. 3 illustrates another exemplary lenticular lens grating consistent with the disclosed embodiments. As shown in FIG. 3, lens grating 300 may include series of lens units 10, series of non-lens units 201, and series of non-lens units 202. Other structures may also be included.

The series of lens units 10 may be arranged with a spatial period (e.g., grating period) T1. Each lens unit 10 may be a lenticular lens and may have a cross-section shape of a convex lens. Other types of lens or lens shapes may also be used. For example, each lens unit 10 may also have a cross-section shape of a concave lens. The length of the bottom of each lens unit 10 is also T1.

The series of non-lens units 201 may be arranged with a spatial period of t1. Each non-lens unit 201 may be a plane on top of each corresponding lens unit 10 and perpendicular to the optical axis of the lens unit 10. The non-lens unit 201 has a length of t1 that is less than the length of the lens unit 10.

The series of non-lens units 202 may be arranged with a spatial period of t2. Each non-lens unit 202 may be a plane between any two adjacent lens units 10 and perpendicular to the optical axis of the lens unit 10. Alternatively, the non-lens unit 202 may also be any appropriate non-planar shape, such as arc shaped, triangular shaped, or trapezoidal shaped. In one embodiment, the non-lens unit 202 is plane shaped. The non-lens unit 202 has a length of t2 that is less than the length of the lens unit 10.

More specifically, the sum of the spatial period of the non-lens units 201 and the spatial period of the non-lens units 202 (T2=t1+t2) may be less than the length of the length of the lends unit 10. For example, $\frac{1}{3} \times T1 < T2 < \frac{2}{3} \times T1$. In one embodiment, $T2 = \frac{7}{12} \times T1$. Because the additional non-lens units 201 and 202, the Moire fringe effect may be significantly reduced.

Figure 4:
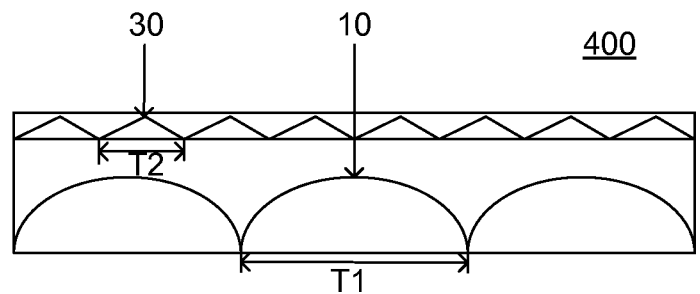
FIG. 4 illustrates another exemplary lenticular lens grating consistent with the disclosed embodiments.

FIG. 4 illustrates another exemplary lenticular lens grating consistent with the disclosed embodiments. As shown in FIG. 4, lens grating 400 may include series of lens units 10 and series of non-lens units 30. Other structures may also be included.

The series of lens units 10 may be arranged with a spatial period (e.g., grating period) T1. Each lens unit 10 may be a lenticular lens and may have a cross-section shape of a convex lens. Other types of lens or lens shapes may also be used. For example, each lens unit 10 may also have a cross-section shape of a concave lens. The length of the bottom of each lens unit 10 is also T1.

The series of non-lens units 30 may be a series of curved lens arranged in a curved lens array disposed above the lens grating 10 (i.e., series of lens units 10) and with a spatial period of T2. Each non-lens unit 30 may be curved lens unit with any appropriate shape. For example, the non-lens unit 30 may have a triangular shape, or may have an arc shape or a trapezoidal shape. The non-lens unit 30 has a length of T2 that is less than the length of the lens unit 10. For example, $\frac{1}{3} \times T1 < T2 < \frac{2}{3} \times T1$. In one embodiment, $T2 = \frac{5}{12} \times T1$. Because the additional non-lens units 30, the Moire fringe effect may be significantly reduced.

Further, the configurations in the above disclosed embodiments may be combined in any appropriate ways. For example, FIG. 5 illustrates another exemplary lenticular lens grating incorporating certain such combinations.

Figure 5:
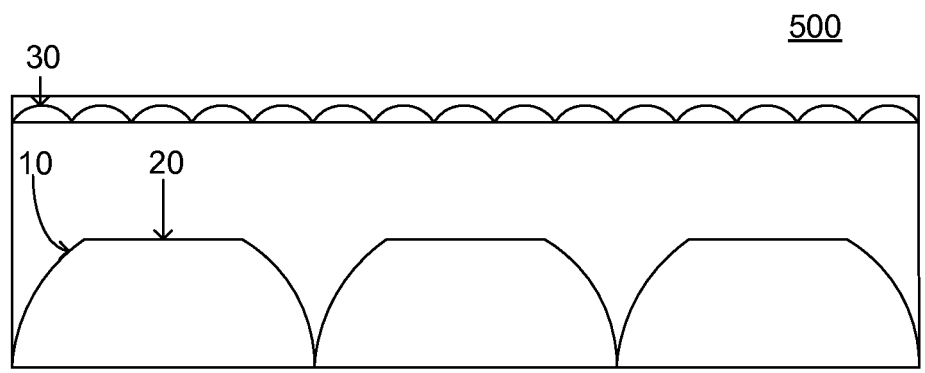
FIG. 5 illustrates another exemplary lenticular lens grating incorporating certain such combinations.

As shown in FIG. 5, lens grating 500 may include series of lens units 10, series of non-lens units 20, and series of non-lens units 30. Other structures may also be included. The series of lens units 10 may be an array of convex lens, and the non-lens units 20 may be a series of planes on top of each corresponding lens unit 10 and perpendicular to the optical axis of the lens unit 10. Further, the series of non-lens units 30 may be a series of convex lens arranged in a curved lens array disposed above the lens grating 10. Other configurations may also be used.

Thus, according to disclosed embodiments, the 3D display panel of an autostereoscopic display system may include a lens grating lens, which may contain series of lens units arranged in a first period and non-lens units arranged in a second period. The first period is the length of each lens unit along the direction of arranging the lens units, and the second period is the length of the non-lens unit along the direction of arranging the non-lens units. The second period is less than the first period. The lens units may be a lenticular grating, a liquid crystal lens grating, or a combination of lenticular grating and liquid crystal lens grating. The shape of the lens unit may be convex lens or may be concave lens. The non-lens unit may be disposed on a single lens unit, or may be provided between adjacent lens units, or may be separately arranged over the series of lens units. Other configurations may also be used.

Figure 6:
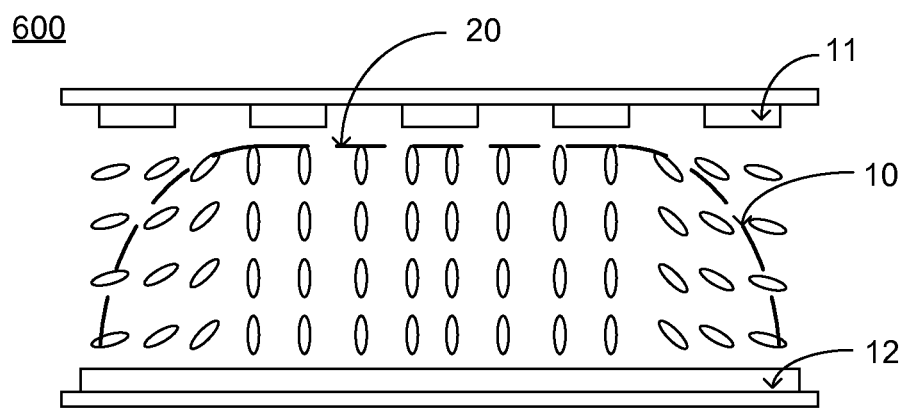
FIG. 6 illustrates an exemplary liquid crystal lens grating consistent with the disclosed embodiments.

The lens unit may also be a liquid crystal lens unit. FIG. 6 illustrates an exemplary liquid crystal lens grating consistent with the disclosed embodiments.

As shown in FIG. 6, liquid crystal lens grating 600 may include a series of liquid crystal lens unit 10. Each liquid crystal lens unit 10 may include an upper substrate, a lower substrate, and a liquid crystal layer filled between the upper substrate and lower substrates of the liquid crystal layer. Further, a first electrode layer 11 may be disposed on the upper substrate, and a second electrode layer 12 may be disposed on the lower substrate.

The first electrode layer 11 may include a plurality of equally spaced and parallel strip electrodes, and the second electrode layer 12 is a plate electrode. The strip electrodes may have identical width. Further, among the plurality of first electrodes, five (5) consecutive strip electrodes may form an electrode unit, which may cause the liquid crystal layer between the five consecutive strip electrodes and the second electrode layer to form a liquid crystal lens unit. Any number of consecutive strip electrodes may be used to for a lens unit.

When driving voltages are applied on the first electrode layer 11 and the second electrode layer 12, the voltage value of all regions of the second electrode, a plate electrode, is the same, and various voltage values may be applied on the strip electrodes. For example, the voltage values respectively applied on the middle three (3) strip electrodes are equal, and the voltage values of the two end strip electrodes may be decreased uniformly.

Because the voltages applied on the upper strip electrodes are different, the degrees of the rotations the liquid crystal molecules in different regions may also be different. Thus, an equivalent lens unit 10 may be formed corresponding to the 5 strip electrodes, i.e., the equivalent lens unit 10 has a period of 5 electrodes.

Further, because the middle three strip electrodes have the same driving voltage value, no difference in the liquid crystal molecule rotation, which form an equivalent of a non-lens plane 20 on top of the liquid crystal lens unit 10. The non-lens unit 20 thus has a period of 3 electrodes.

Figure 7:
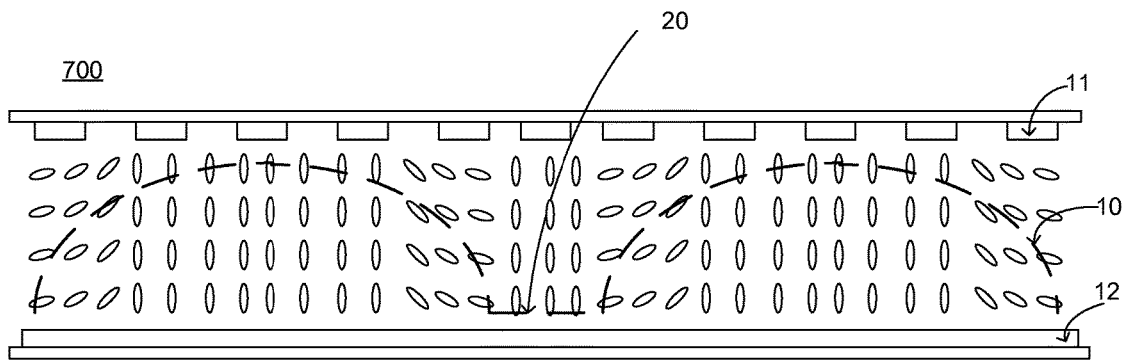
FIG. 7 illustrates an exemplary liquid crystal lens grating consistent with the disclosed embodiments.

FIG. 7 illustrates an exemplary liquid crystal lens grating consistent with the disclosed embodiments. As shown in FIG. 7, similar to liquid crystal lens grating 600, liquid crystal lens grating 700 may include series of liquid crystal lens unit 10. Each liquid crystal lens unit 10 may be formed by five (5) strip electrodes being applied with different voltage values, being symmetric to the center electrode and gradually decreasing towards the two ends. Thus, the equivalent lens unit is a convex lens (or a concave lens). Thus, the equivalent lens unit 10 may be formed corresponding to the 5 strip electrodes, i.e., the equivalent lens unit 10 has a period of 5 electrodes.

Further, a single separate electrode is disposed between two adjacent electrode units, and having the same voltage with the two end electrodes of the two adjacent electrode units, such that the rotation degree of the liquid crystal molecules is maintained as the same and no equivalent lens is formed corresponding to the separate electrode. Thus, a non-lens unit 20 is formed corresponding to the separate electrode and has a period of 1 electrode. Alternatively, the separate electrode may be applied a different voltage or a uniformly changing voltage to form an equivalent of a triangular non-lens unit or an arc shape non-lens unit.

Figure 8:
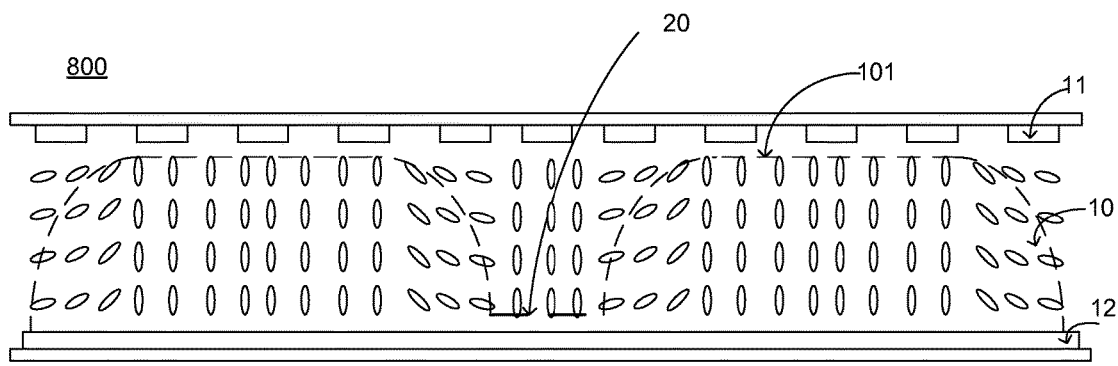
FIG. 8 illustrates an exemplary liquid crystal lens grating consistent with the disclosed embodiments.

FIG. 8 illustrates an exemplary liquid crystal lens grating consistent with the disclosed embodiments. As shown in FIG. 8, similar to liquid crystal lens grating 700, liquid crystal lens grating 800 may include a series of liquid crystal lens unit 10. Each liquid crystal lens unit 10 may be formed by five (5) strip electrodes being applied with different voltage values, being symmetric to the center electrode and gradually decreasing towards the two ends. Thus, the equivalent lens unit is a convex lens (or a concave lens). Thus, the equivalent lens unit 10 may be formed corresponding to the 5 strip electrodes, i.e., the equivalent lens unit 10 has a period of 5 electrodes.

A non-lens unit 20 is formed corresponding to the separate electrode and has a period of 1 electrode. The non-lens unit 20 may be a plane non-lens unit, a triangular non-lens unit, or an arc shape non-lens unit.

Further, the voltage values respectively applied on the middle three (3) strip electrodes are equal, an equivalent of a non-lens plane on top of the liquid crystal lens unit 10 may be formed. The non-lens unit thus has a period of 3 electrodes. Thus, the total non-lens unit period is 1+3=4 electrodes.

Thus, according to disclosed embodiments, the 3D display panel of an autostereoscopic display system may include a lens grating lens, which may contain series of liquid crystal lens units arranged in a first period and liquid crystal non-lens units arranged in a second period. The liquid crystal lens grating may then maintain a different spatial period from the pixels on the display panel, reducing the Moire fringe effect.

Figure 9:
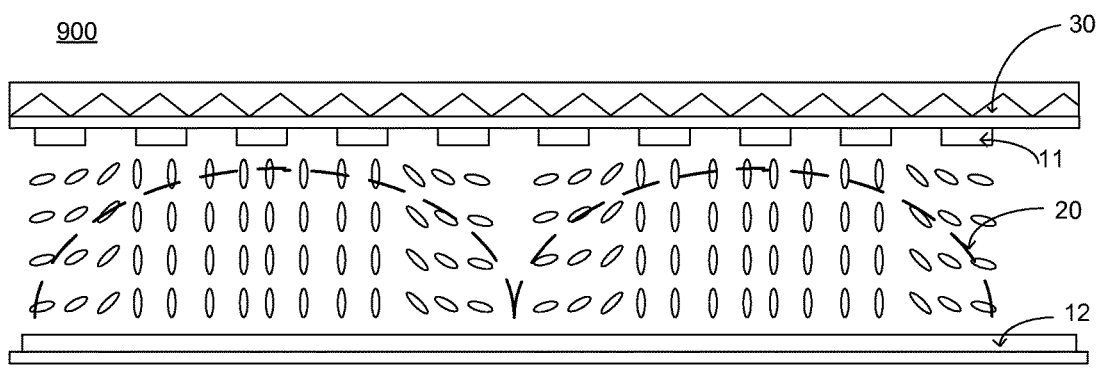
FIG. 9 illustrates an exemplary lens grating consistent with the disclosed embodiments.

The liquid crystal lens units or non-lens units may be used in combination of non-liquid crystal lens units or non-lens units. That is, at least one of the lens unit or non-lens unit in the lens grating is controlled through the liquid crystal lens unit. FIG. 9 illustrates an exemplary lens grating having combined liquid crystal units and non-liquid crystal units consistent with the disclosed embodiments.

As shown in FIG. 9, liquid crystal lens grating 900 may include a series of liquid crystal lens unit 20 and a series of non-lens units 30. Other structures may also be included.

Each liquid crystal lens unit 20 may include an upper substrate, a lower substrate, and a liquid crystal layer filled between the upper substrate and lower substrates of the liquid crystal layer. Further, a first electrode layer 11 may be disposed on the upper substrate, and a second electrode layer 12 may be disposed on the lower substrate.

The first electrode layer 11 may include a plurality of equally spaced and parallel strip electrodes, and the second electrode layer 12 is a plate electrode. Further, among the plurality of first electrodes, five (5) consecutive strip electrodes may form an electrode unit, which may cause the liquid crystal layer between the five consecutive strip electrodes and the second electrode layer to form a liquid crystal lens unit. Any number of consecutive strip electrodes may be used to for a lens unit.

When driving voltages are applied on the first electrode layer 11 and the second electrode layer 12, the voltage value of all regions of the second electrode, a plate electrode, is the same, and various voltage values may be applied on the strip electrodes. For example, the voltage values respectively applied on the middle three (3) strip electrodes are equal, and the voltage values of the two end strip electrodes may be decreased uniformly.

Because the voltages applied on the upper strip electrodes are different, the degrees of the rotations the liquid crystal molecules in different regions may also be different. Thus, an equivalent lens unit 20 may be formed corresponding to the 5 strip electrodes, i.e., the equivalent lens unit 20 has a period of 5 electrodes.

Further, the series of non-lens units 30 may be a series of curved lens arranged in a curved lens array disposed above the lens grating 20 (i.e., series of lens units 20) or below the lens grating 20. Each non-lens unit 30 may be curved lens unit with any appropriate shape. For example, the non-lens unit 30 may have a triangular shape, or may have an arc shape or a trapezoidal shape. The period of lens units 20 is greater than the period of the non-lens units 30.

The liquid crystal lens units may also be used as non-lens units over the lens units illustrated in FIGS. 1-3. The detailed descriptions are omitted.

The above described embodiments are only for illustrative purposes. It should be noted that those skilled in the art, without departing from the principles of the present disclosure, may make certain improvements and modifications, and these improvements and modifications should also be considered within the scope of the disclosure.

Other applications, advantages, alternations, modifications, or equivalents to the disclosed embodiments are obvious to those skilled in the art.

What is claimed is:

1. A three-dimensional (3D) display system for displaying a 3D image, comprising:
    a display panel having pixels arranged at a pixel spatial period;
    a driving circuit;
    a lens grating disposed together with the display panel, wherein the lens grating further includes:
    a plurality of lens units arranged at a first period; and
    a plurality of non-lens units arranged at a second period, being greater than one-third of the first period and less than two-thirds of the first period,
    wherein a direction of periodically arranging the plurality of lens units at the first period is parallel to a direction of periodically arranging the plurality of non-lens units at the second period, and the plurality of non-lens units are disposed above the plurality of lens units,
    such that the lens grating has a different spatial period from the pixel spatial period to reduce Moire fringe effect between the lens grating and the pixels of the display panel,
    wherein the plurality of lens units are a plurality of liquid crystal lens units, including:
    a first electrode layer;
    a second electrode layer; and
    a liquid crystal layer filled between the first electrode layer and the second electrode layer,
    wherein the first electrode layer has an array of striped electrodes having an identical electrode width,
    a plurality of striped electrodes in the array of striped electrodes to form an electrode unit generating a liquid crystal lens unit for splitting parallax light for the 3D display system, and
    at least two middle striped electrodes in the electrode unit are applied with same voltage value by the driving circuit such that a middle area of the liquid crystal lens unit without splitting parallax light for the 3D display system is formed.

2. The 3D display system according to claim 1, wherein:
    the plurality of lens units are an array of lenticular lens units; and
    the plurality of non-lens units are an array of arc shaped, or triangular shaped, or trapezoidal shaped lens units having the second period.

3. The 3D display system according to claim 2, wherein:
    the second period is approximately 5/12 of the first period.

* * * * *